US012001743B2

(12) United States Patent
Kumagai

(10) Patent No.: US 12,001,743 B2
(45) Date of Patent: Jun. 4, 2024

(54) IMAGE PROCESSING APPARATUS, CONTROL METHOD, AND STORAGE MEDIUM FOR SETTING A STORAGE PERIOD FOR A PRINT JOB

(71) Applicant: CANON KABUSHIKI KAISHA, Tokyo (JP)

(72) Inventor: Kanta Kumagai, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/334,163

(22) Filed: Jun. 13, 2023

(65) Prior Publication Data

US 2023/0409261 A1    Dec. 21, 2023

(30) Foreign Application Priority Data

Jun. 20, 2022  (JP) ................. 2022-098622

(51) Int. Cl.
*G06F 3/12*    (2006.01)
(52) U.S. Cl.
CPC ............ *G06F 3/1267* (2013.01); *G06F 3/122* (2013.01)
(58) Field of Classification Search
CPC .............. G06F 3/1267; G06F 3/122
See application file for complete search history.

(56) References Cited

U.S. PATENT DOCUMENTS

| | | | | |
|---|---|---|---|---|
| 9,830,111 | B1* | 11/2017 | Patiejunas | G06F 3/0625 |
| 10,630,863 | B2* | 4/2020 | Nakajima | G06F 3/1267 |
| 2012/0107030 | A1* | 5/2012 | Goto | G06F 3/1238 400/76 |
| 2013/0021646 | A1* | 1/2013 | Ichikawa | G06K 15/1817 358/1.15 |
| 2013/0070281 | A1* | 3/2013 | Utsumi | G06F 3/1285 358/1.14 |
| 2014/0006964 | A1* | 1/2014 | Pan | G06F 3/0484 715/738 |
| 2015/0055183 | A1* | 2/2015 | Kaneko | G06F 3/1211 358/1.16 |
| 2019/0235815 | A1* | 8/2019 | Takagi | G06F 21/1078 |
| 2022/0229917 | A1* | 7/2022 | Konishi | G03G 21/046 |

FOREIGN PATENT DOCUMENTS

JP    2008005092 A    1/2008

* cited by examiner

*Primary Examiner* — Benjamin O Dulaney
(74) *Attorney, Agent, or Firm* — Canon U.S.A., Inc. IP Division

(57) ABSTRACT

When a second storage device having a storage capacity larger than a storage capacity of a first storage device is usable, a storage unit stores a received print job in the second storage device. When the second storage device having a storage capacity larger than a storage capacity of the first storage device is usable, a setting unit is able to set a second storage period longer than a first storage period as a storage period for the print job stored in the second storage device.

11 Claims, 12 Drawing Sheets

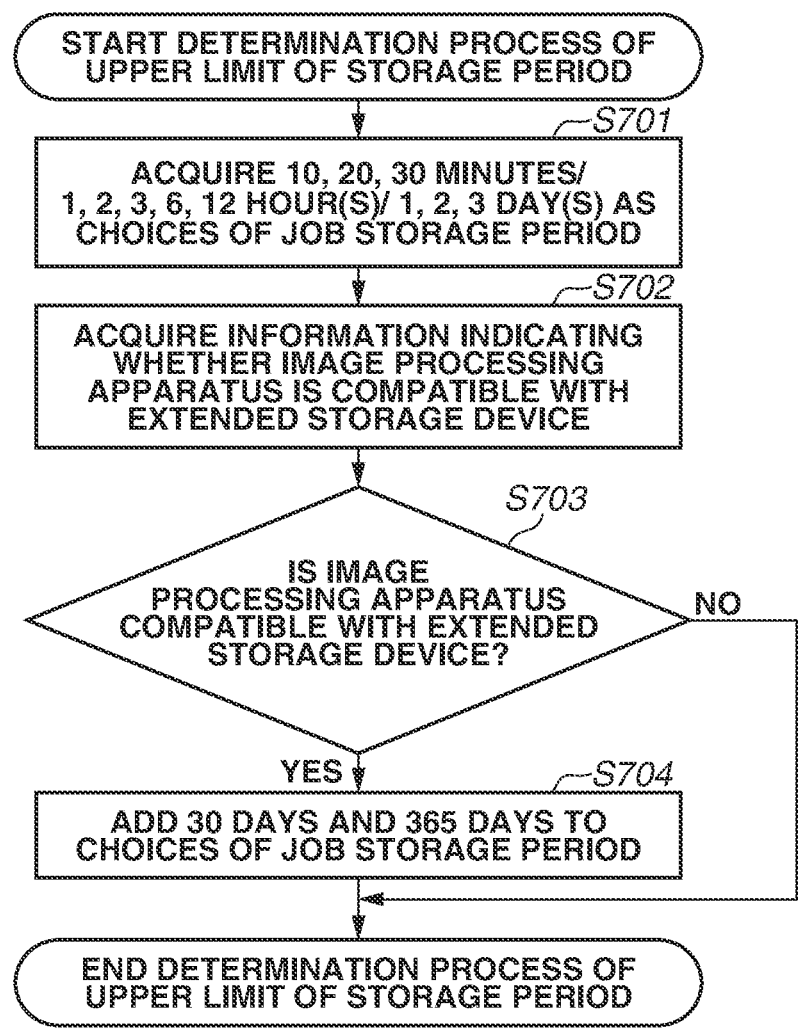

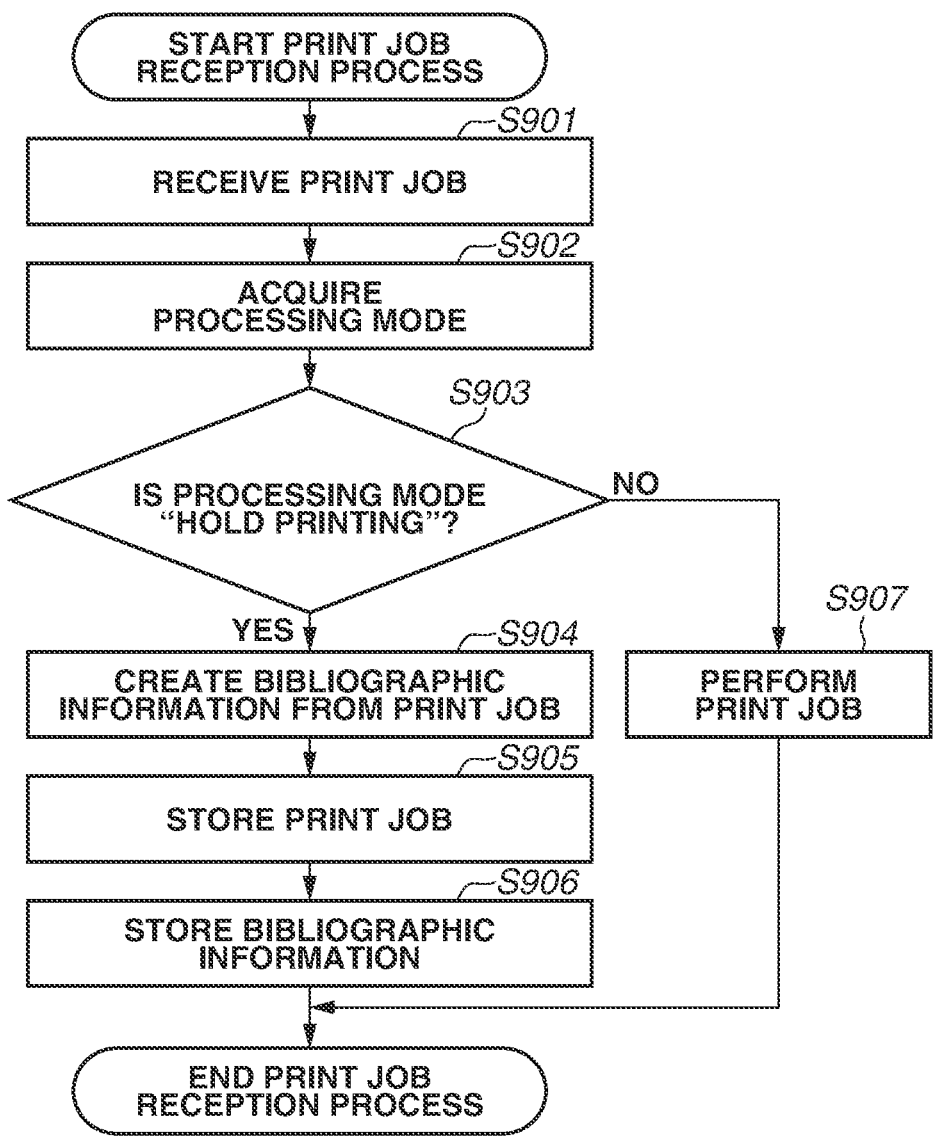

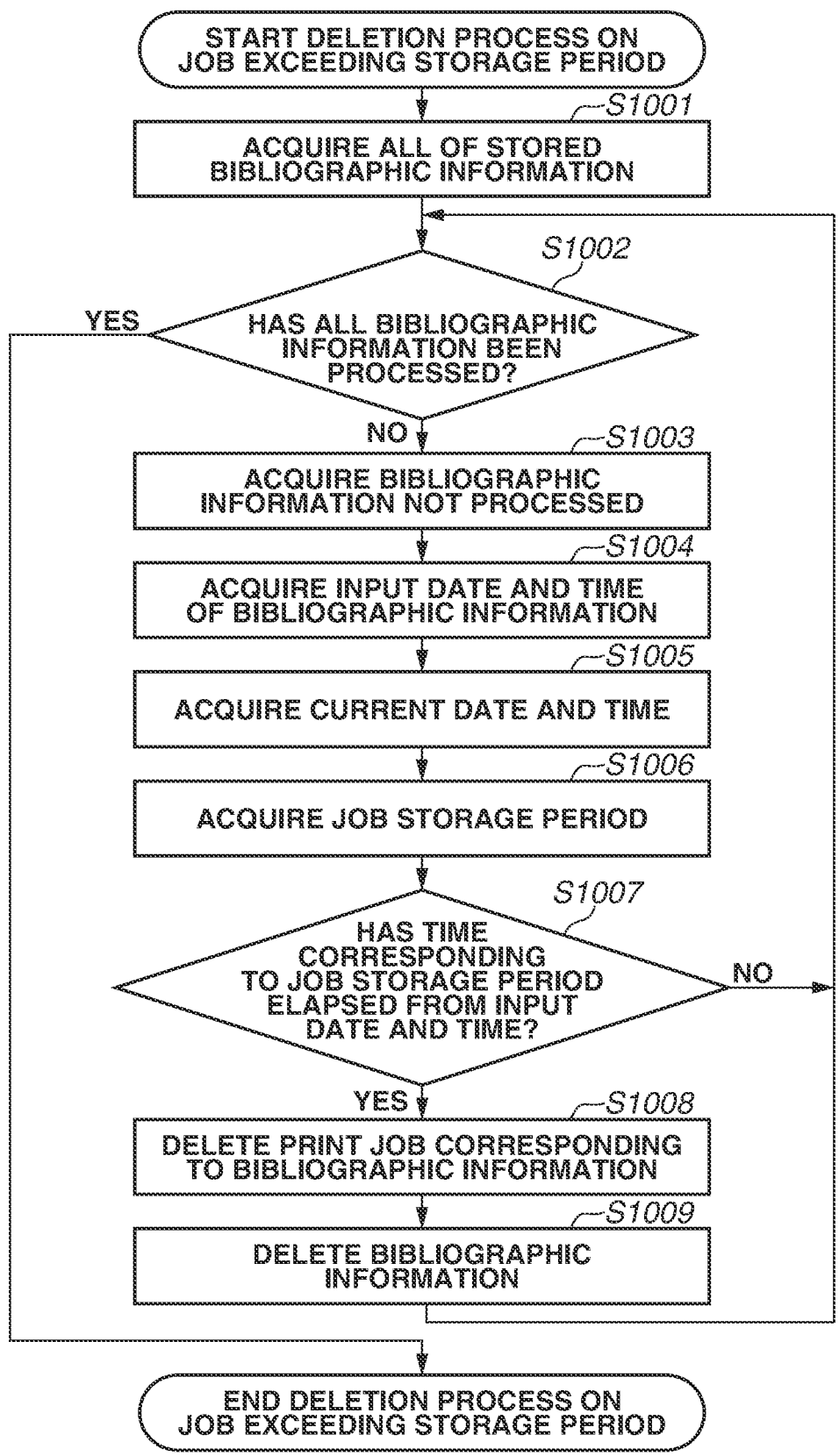

IMAGE PROCESSING APPARATUS, CONTROL METHOD, AND STORAGE MEDIUM FOR SETTING A STORAGE PERIOD FOR A PRINT JOB

BACKGROUND

Field of the Disclosure

The present disclosure relates to an image processing apparatus that stores a print job sent from an external apparatus in a storage device, to a control method, and to a storage medium.

Description of the Related Art

Recent image processing apparatuses have a hold function of temporarily holding print jobs sent from PCs in their internal storage device. A user can log in to an image processing apparatus having this function at his or her desired timing and can have the image processing apparatus print a print job previously sent by this user. With this function, documents are stored in an internal storage device, and in a case of exceeding the capacity of the relevant storage area, the internal storage device cannot hold any more print jobs. Therefore, by setting a print job storage period and automatically deleting a print job whose storage period has elapsed from its input date and time, the capacity of the internal storage device can be prevented from being fully used. Further, Japanese Patent Application Laid-Open No. 2008-5092 discusses a technique for specifying a print job storage destination per folder, setting a storage period for each storage destination folder, and managing a print job storage period per folder.

SUMMARY

According to embodiments of the present disclosure, an image processing apparatus includes a reception unit configured to receive a print job from an external apparatus, a storage unit configured to store the received print job in a first storage device, and a setting unit configured to set a first storage period for the print job stored in the first storage device, wherein, in a case where a second storage device having a storage capacity larger than a storage capacity of the first storage device is usable, the storage unit stores the received print job in the second storage device, and wherein, in a case where the second storage device having a storage capacity larger than a storage capacity of the first storage device is usable, the setting unit is able to set a second storage period longer than the first storage period as a storage period for the print job stored in the second storage device.

Further features of the present disclosure will become apparent from the following description of exemplary embodiments with reference to the attached drawings.

BRIEF DESCRIPTION OF THE DRAWINGS

FIG. 7 is a flowchart illustrating an example of a process for determining the storage period upper limit of a print job of the image processing apparatus.

FIG. 9 is a flowchart illustrating an example of a print job reception process of the image processing apparatus.

FIG. 10 is a flowchart illustrating an example of a print job deletion process of the image processing apparatus, the process being performed on a print job exceeding a storage period.

DESCRIPTION OF THE EMBODIMENTS

When a first storage device (an internal storage device) of an image processing apparatus has a small storage area for print jobs, the upper limit of the storage period needs to be set low in advance to prevent the capacity of the storage area from being fully used. As options, various devices can be mounted on the image processing apparatus. One of the options is a second storage device (an extended storage device) having a storage capacity larger than that of the first storage device. By mounting the second storage device on the image processing apparatus, the amount and size of the above-described temporarily held print jobs can be increased. However, if the upper limit of the print job storage period remains low even after the second storage device is connected, the capacity of the second storage device cannot be sufficiently utilized.

Thus, embodiments of the present disclosure are directed to providing a mechanism for efficiently utilizing the storage capacity of the second storage device when the second storage device is usable as a storage device for storing print jobs.

Hereinafter, embodiments of the present disclosure will be described as examples in detail with reference to the drawings. However, the constituent elements described in these exemplary embodiments are only examples, and the scope of the present disclosure is not limited to these examples only.

Figure 1:
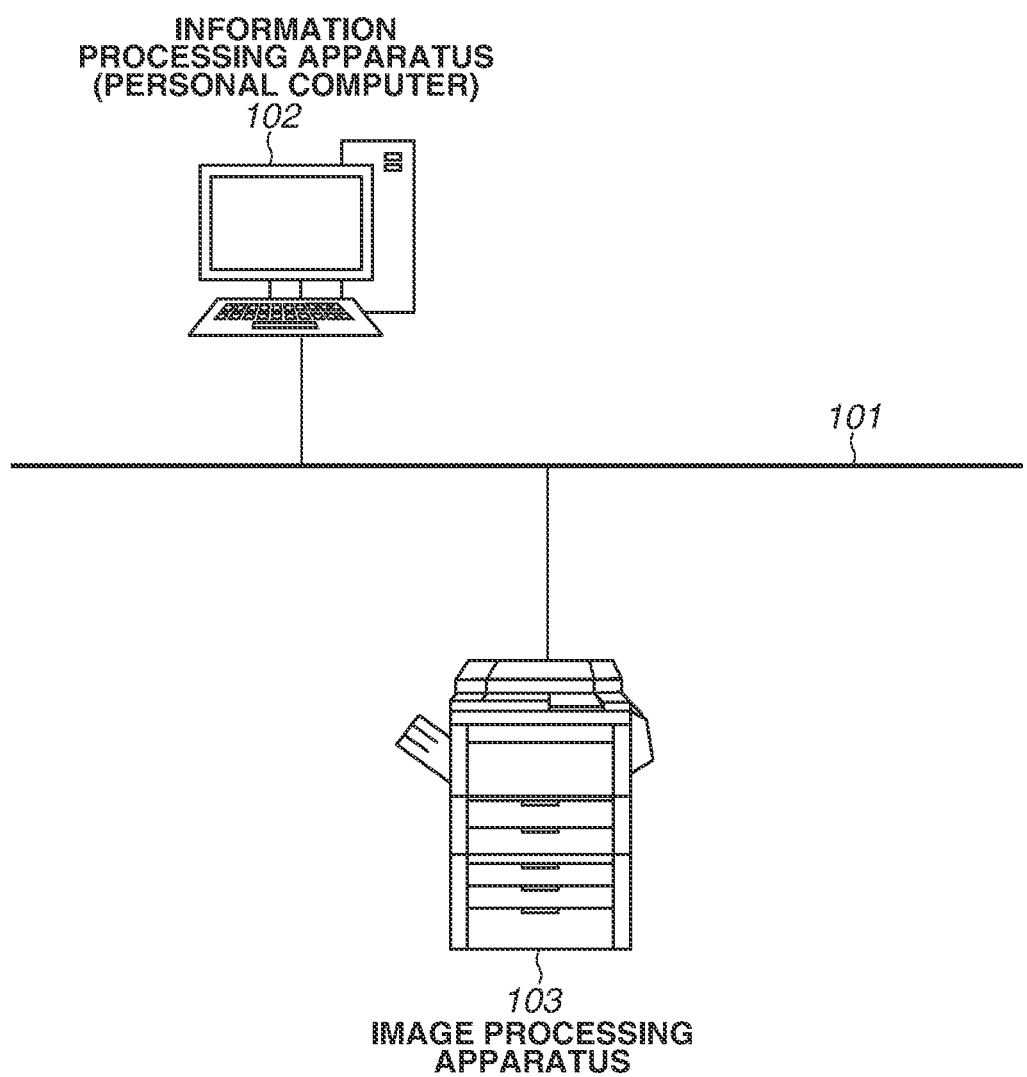
FIG. 1 illustrates a network configuration of a system.

FIG. 1 illustrates a network configuration to which an image processing apparatus according to an exemplary embodiment of the present disclosure and an information processing apparatus (a personal computer) are applicable. In FIG. 1, a network 101 supports, for example, the Transmission Control Protocol/Internet Protocol (TCP/IP). A personal computer 102 serving as an information processing apparatus and an image processing apparatus 103 are connected to the network 101.

Figure 2:
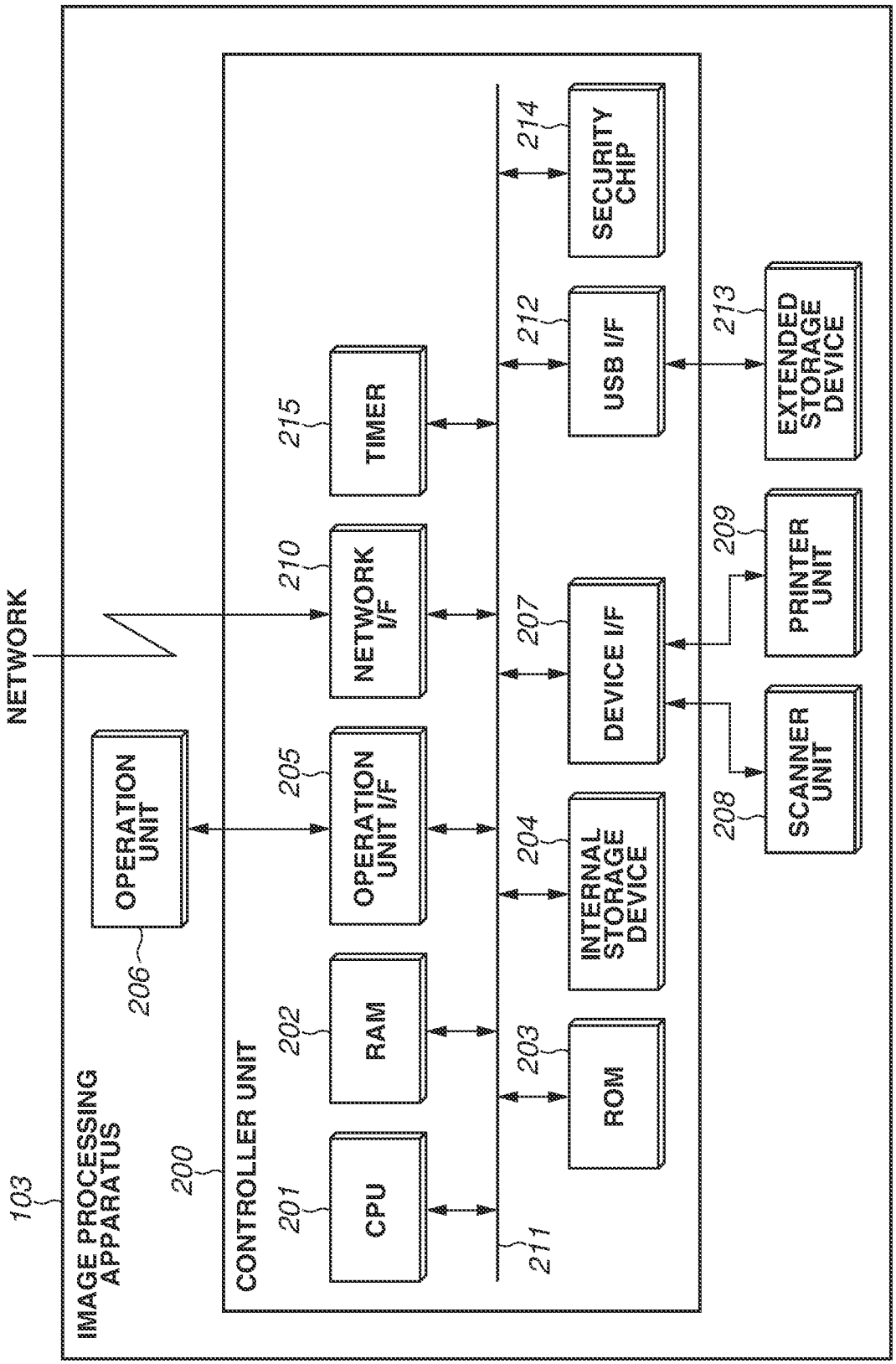
FIG. 2 schematically illustrates a configuration of an image processing apparatus.

FIG. 2 schematically illustrates a configuration of the image processing apparatus 103 according to the present exemplary embodiment of the present disclosure.

In FIG. 2, the image processing apparatus 103 includes a controller unit 200, an operation unit 206, a scanner unit 208, a printer unit 209, and an extended storage device 213.

The controller unit 200 controls the image processing apparatus 103 or a printer. The controller unit 200 includes a central processing unit (CPU) 201, a random access memory (RAM) 202, a read-only memory (ROM) 203, an internal storage device 204, an operation unit interface (I/F) 205, a device I/F 207, a network I/F 210, and a universal serial bus (USB) I/F 212, which are connected to each other via a system bus 211.

The CPU 201 controls the entire image processing apparatus 103 by comprehensively controlling the devices connected to the system bus 211. The RAM 202 stores programs such as an operating system, system software, and application software, and data. The ROM 203 stores a system boot program and a system program.

The ROM 203 may also store information needed for the image processing apparatus 103, such as font information. The boot program is executed by the CPU 201 when the image processing apparatus 103 is powered on. The boot program performs a boot-related process. The internal storage device 204 is a hard disk drive and stores the operating system, system software, image data, setting data, application programs, print jobs sent from the information processing apparatus 102, and bibliographic information about the print jobs, for example. However, as will be described below, once the connection of the extended storage device 213 is detected, the print jobs sent from the information processing apparatus 102 and the bibliographic information about the print jobs are stored in the extended storage device 213. Examples of the internal storage device 204 include an embedded Multi Media Card (eMMC).

The programs stored in the RAM 202 are executed by the CPU 201 such that the image data and non-image data stored in the RAM 202, the ROM 203, and the internal storage device 204 are processed.

The operation unit I/F 205 is connected to the operation unit 206 having a touch panel and outputs the image data to be displayed on the operation unit 206 to the operation unit 206. In addition, the operation unit I/F 205 provides the CPU 201 with information that a user has entered to the operation unit 206.

The device I/F 207 connects the scanner unit 208 and the printer unit 209, which are image input and output devices, to the controller unit 200, to exchange image data. The image data sent from the scanner unit 208 via the device I/F 207 is stored in the RAM 202 or the internal storage device 204. As needed, image processing or the like is performed on the stored image data by an application program stored in the RAM 202. The image data is outputted to the printer unit 209 via the device I/F 207. The network I/F 210 connects to a network, to exchange image data or information for controlling the image processing apparatus 103 with an external apparatus on the network. The extended storage device 213 is mounted on the image processing apparatus 103 and stores the print jobs sent from the information processing apparatus 102 and the bibliographic information about the print jobs. However, as described above, the print jobs sent from the information processing apparatus 102 and the bibliographic information about the print job are stored in the internal storage device 204 until the connection of the extended storage device 213 is detected. A security chip 214 stores an encryption and decryption control system 314, which will be described below, and is also used for storing an encryption key used for encryption and decryption by the extended storage device 213. Examples of the extended storage device 213 include a solid state drive (SSD). The present exemplary embodiment assumes that the storage capacity of the extended storage device 213 is larger than that of the internal storage device 204. A timer 215 manages the data and time. The timer 215 is used for acquiring the current date and time when a print job is deleted.

Figure 3:
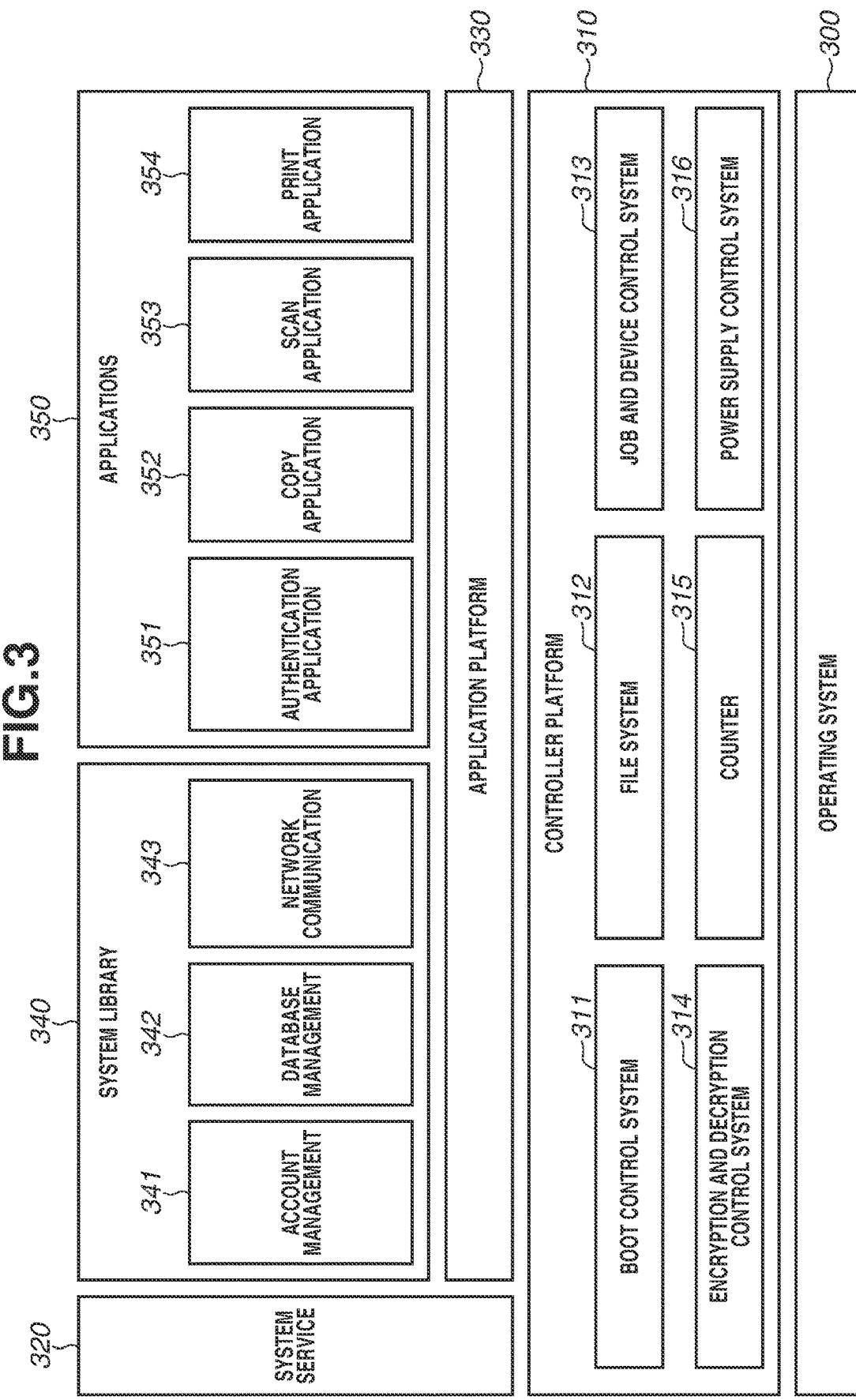
FIG. 3 illustrates a software configuration of the image processing apparatus.

FIG. 3 illustrates a software configuration of the image processing apparatus 103 according to the present exemplary embodiment of the present disclosure, and this software configuration is implemented on the controller unit 200. The software processed by the controller unit 200 included in the image processing apparatus 103 or the printer is implemented as firmware and is executed by the CPU 201.

An operating system 300 provides various resource management services and frameworks, which are optimized to control the embedded system, for the software running thereon. The various resource management services provided by the operating system 300 include multi-task management and inter-task communication. In the multi-task management, a plurality of executable contexts of processes performed by the CPU 201 are managed such that a plurality of processes are operated substantially in parallel. In the inter-task communication, synchronization between tasks and data exchange are realized. The operating system 300 also provides memory management, interrupt management, various device drivers, a protocol stack that implements processing of various protocols for local interface, network, communication, and the like.

A controller platform 310 includes a boot control system 311, a file system 312, a job and device control system 313, the encryption and decryption control system 314, a counter 315, and a power supply control system 316. The boot control system 311 performs a boot process procedure illustrated in FIG. 4 and completes the boot-up of the image processing apparatus 103. The file system 312 is a mechanism for storing data constructed on the storage devices such as the internal storage device 204, the RAM 202, and the extended storage device 213 and is used for spooling jobs handled by the controller unit 200 and storing various types of data. The job and device control system 313 controls hardware of the image processing apparatus 103, the printer, or the extended storage device 213 and controls jobs that use basic functions (printing, scanning, communication, image conversion, etc.) mainly provided by the hardware. The encryption and decryption control system 314 provides functions relating to encryption and decryption by the extended storage device 213. When the image processing apparatus 103 is booted, the encryption and decryption control system 314 reads an encryption key and settings used for encryption and decryption. Thereafter, the data written on the extended storage device 213 can be encrypted, and the data read from the extended storage device 213 can be decrypted. The encryption key is generated at the time of initial boot-up and is stored in the security chip 214.

In the present exemplary embodiment, the description of the generation of the encryption key is omitted. The counter 315 manages a counter value based on an expiration date per application and printer and scanner usage records. The power supply control system 316 performs power supply control operations such as a process for shifting to a power-saving mode and a process for returning to the operation mode from the power-saving mode in view of the operation status of each application after the boot-up of the image processing apparatus 103. When the image processing apparatus 103 operates in the power-saving mode, the power supply control system 316 stops power supply to the scanner unit 208, the printer unit 209, and the extended storage device 213. In this way, only the needed operations are performed. That is, the power consumption can be reduced.

A system service 320 is a module for monitoring the operation status of the image processing apparatus 103 or the printer and for downloading software and a license from a software distribution server via a network. An application platform 330 is middleware for enabling a system library 340 and applications 350, which will be described below, to use the operating system 300 and the mechanisms of the controller platform 310. The system library 340 is a software module that has functions of providing services that can be used from the applications 350 and includes account management 341, database management 342, and network communication 343. The applications 350 are software modules that are capable of displaying a menu on the operation unit 206 and receiving an input from the user and that provide the user with various functions implemented by the image processing apparatus 103 or the printer.

An authentication application 351, which is one of the applications 350, manages users who can use the image processing apparatus 103 by using the account management 341 included in the system library 340. A copy application 352, which is one of the applications 350, accesses the job and device control system 313 via the application platform 330 and provides a function of copying paper documents. A scan application 353, which is one of the applications 350, accesses the job and device control system 313 via the application platform 330 and provides a function of scanning paper documents and converting the obtained data into electronic data. A print application 354, which is one of the applications 350, provides functions of holding received print jobs and creating bibliographic information for managing the print jobs. The print jobs and the bibliographic information about the print jobs are stored in the internal storage device 204 until the connection of the extended storage device 213 is detected. After the connection of the extended storage device 213 is detected, the subsequent print jobs and the bibliographic information about the print jobs are stored in the extended storage device 213. In addition, the print application 354 accesses the job and device control system 313 via the application platform 330 and provides a function of outputting of print jobs based on print commands.

Figure 4:
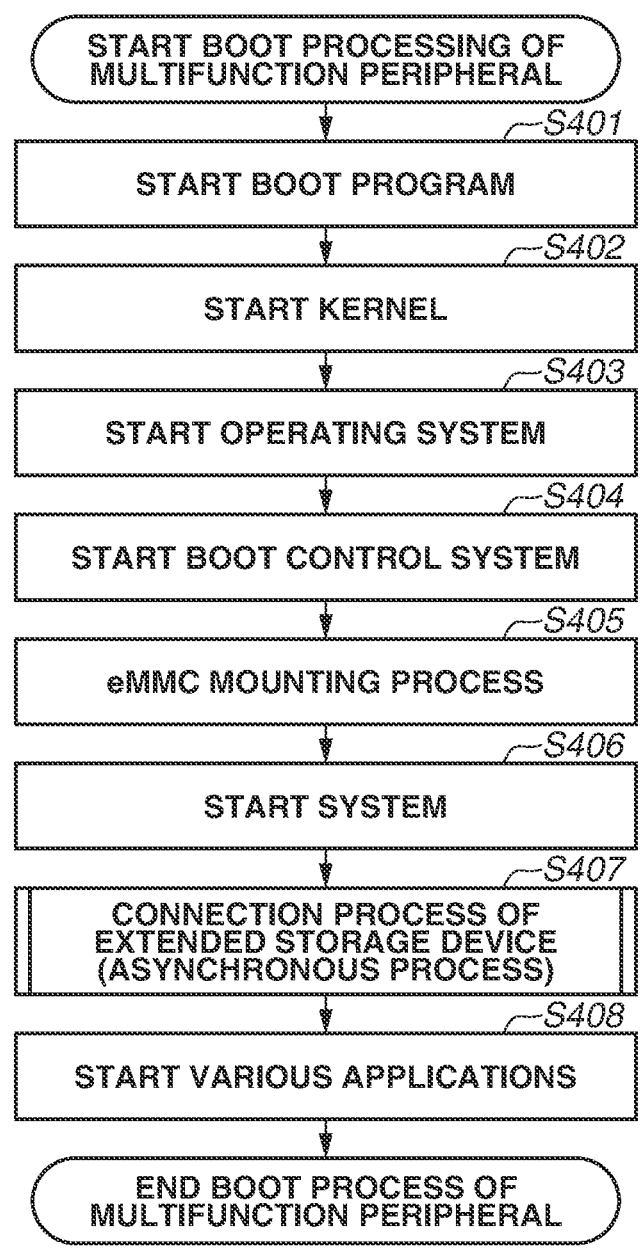
FIG. 4 is a flowchart illustrating an example of a procedure of a boot process of the image processing apparatus.

In FIG. 4, first, a kernel stored in the first partition of the internal storage device 204 is booted by the system boot program stored in the ROM 203. Next, a mounting process using the second and subsequent partitions of the internal storage device 204, a connection process of the extended storage device 213 connected to the USB, and a boot-up process of various applications are performed. The kernel assists the operation of an application by reading a driver having a function of enabling the application to access and use hardware such as the CPU 201, the RAM 202, the internal storage device 204, and the extended storage device 213. Mounting is a mechanism for enabling an application to access an area in a storage device via a file system. By performing this mounting, an application is able to refer to an area in a storage device as a folder or a file.

In step S401, the CPU 201 reads the system boot program stored in the ROM 203 and loads the boot program into the RAM 202, and the operation proceeds to step S402. In step S402, the boot program loads the kernel stored in the first partition of the internal storage device 204 into the RAM 202 and boots the kernel, and the operation proceeds to step S403. As a result, the kernel reads drivers having functions of enabling various applications to access and use the CPU 201, the RAM 202, the internal storage device 204, and the extended storage device 213 and assists the operations of these applications. In step S403, the CPU 201 loads the operating system 300 stored in the first partition of the internal storage device 204 into the RAM 202 and boots the operating system 300, and the operation proceeds to step S404. In step S404, the operating system 300 loads the boot control system 311 stored in the first partition of the internal storage device 204 into the RAM 202 and boots the boot control system 311, and the operation proceeds to step S405. Thereafter, the boot control system 311 booted in step S404 performs the boot process.

In step S405, the boot control system 311 performs the mounting using the second and subsequent partitions of the internal storage device 204, and the operation proceeds to step S406. As a result, each application can refer to the areas in the second and subsequent partitions of the internal storage device 204 via the file system. As the area that can be used by the print application 354, a "/PRINT" folder is provided. The print application 354 stores a received print job and created bibliographic information in the "/PRINT" folder. In this way, the data can be held in an area of the internal storage device 204. In step S504 illustrated in FIG. 5, when the connection checking of the extended storage device 213 times out and the absence of the extended storage device 213 is determined, the "/PRINT" folder, which is an area in the internal storage device 204, continues to serve as the data storage area of the print application 354.

In step S406, the boot control system 311 boots the system library (341, 342, and 343) stored in the internal storage device 204, and the operation proceeds to step S407. As a result, each application can refer to setting files, etc., in the internal storage device 204 when these applications are started. In step S407, the boot control system 311 performs the connection process of the extended storage device 213, and the operation proceeds to step S408. The connection process of the extended storage device 213 will be described below with reference to FIG. 5.

The connection process of the extended storage device 213 is performed asynchronously, and step S408 is performed before the connection process of the extended storage device 213 is completed. This is because there is no need to wait for the completion of the connection process of the extended storage device 213 to start the applications (351, 352, 353, and 354), and it is desirable to provide the functions of the applications to the user as promptly as possible. In step S408, the boot control system 311 starts the applications (351, 352, 353, and 354). Thus, the print application 354 is started and can display a held print job list screen on the operation unit 206. If the extended storage device 213 is not physically connected, the "/PRINT" area in the internal storage device 204 can be referred to in step S408, and print jobs and their bibliographic information can be stored in the "/PRINT" area. However, if the extended storage device 213 is connected, the completion of the asynchronous process in step S407 needs to be awaited since the "/PRINT" area in the extended storage device 213 cannot be referred to until the asynchronous process in step S407 is completed.

Figure 5:
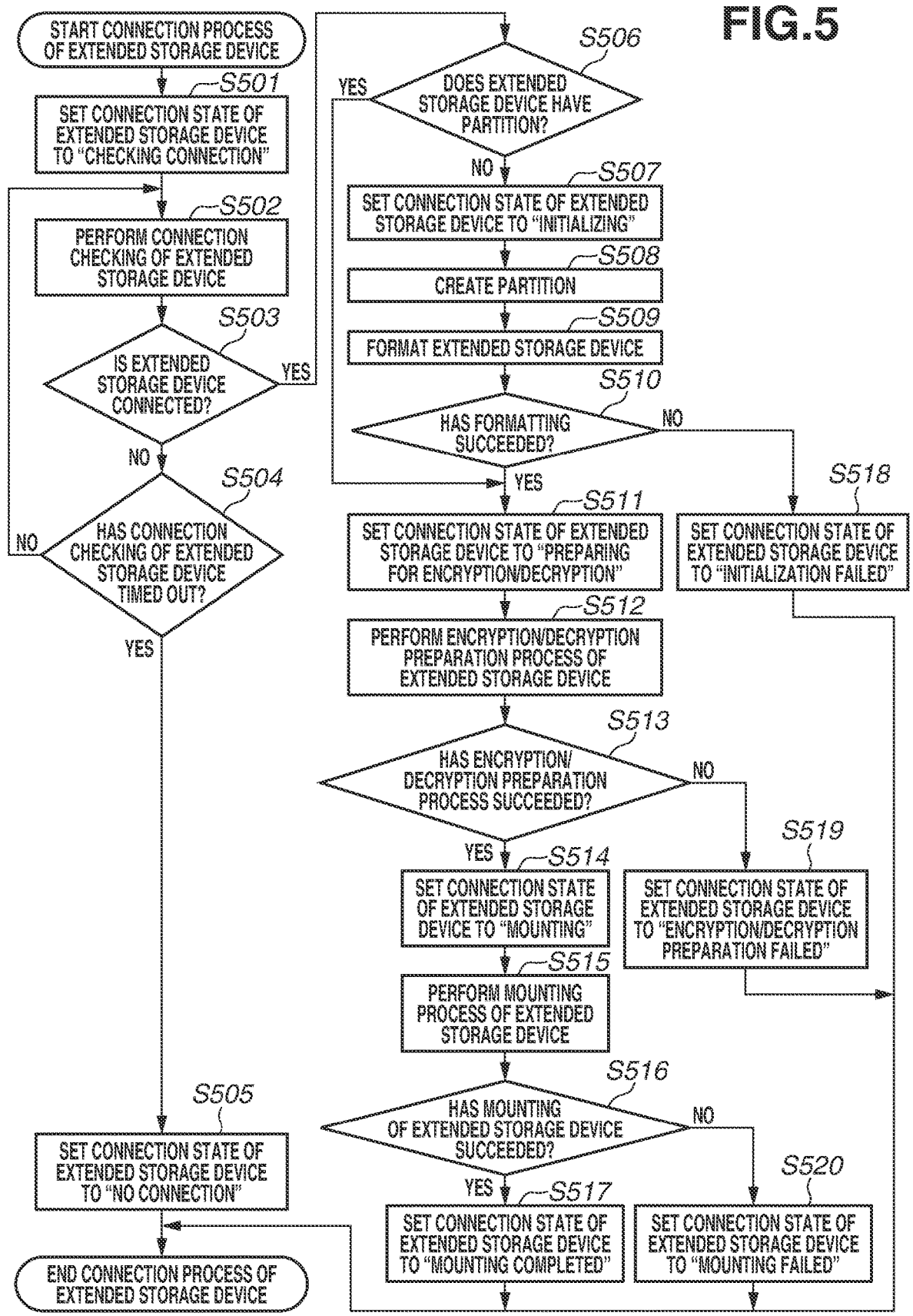
FIG. 5 is a flowchart illustrating an example of a procedure of an extended storage device connection process of the image processing apparatus.

FIG. 5 is a flowchart illustrating the connection process of the extended storage device 213 in step S407. In step S501, the boot control system 311 stores the connection state of the extended storage device 213 in the RAM 202 as "checking connection", and the operation proceeds to step S502. The connection state of the extended storage device 213 stored in the RAM 202 will be referred to in flowcharts for determining the storage period illustrated in FIGS. 7 and 11. In step S502, the boot control system 311 checks the connection state of the extended storage device 213, and the operation proceeds to step S503. As a method for checking whether the extended storage device 213 is connected, a vender ID (VID) and a product ID (PID) of an extended storage device, which are stored in advance in the internal storage device 204, are used. The boot control system 311 checks whether a VID and a PID of a USB device recognized by the USB I/F 212 match those stored in the internal storage device 204. In step S503, the boot control system 311 determines whether the extended storage device 213 is connected based on step S502. As a result of the checking in step S502, if both the VIP and the PID match the VID and the PID of the extended storage device stored in the internal storage device 204, the boot control system 311 determines that the extended storage device 213 is connected. If the extended storage device 213 is connected (Yes in step S503), the operation proceeds to step S506. Otherwise (No in step S503), the operation proceeds to step S504. In step S504, the boot control system 311 determines whether the connection checking time of the extended storage device 213 has exceeded a predetermined timeout period. The present exemplary embodiment assumes that the timeout period is stored in advance in the internal storage device 204. If the connection checking time has exceeded the timeout period (Yes in step S504), the operation proceeds to step S505. Otherwise (No in step S504), the operation proceeds to step S502. In step S505, the boot control system 311 stores the connection state of the extended storage device 213 in the RAM 202 as "no connection" and ends the sequence. In step S506, the boot control system 311 determines whether the extended storage device 213 has a partition. If there is a partition (YES in step S506), the operation proceeds to step S511. Otherwise (NO in step S506), the operation proceeds to step S507. In step S507, the boot control system 311 stores the connection state of the extended storage device 213 in the RAM 202 as "initializing", and the operation proceeds to step S508. In step S508, the boot control system 311 creates a partition in the extended storage device 213, and the operation proceeds to step S509. In step S509, the boot control system 311 formats the extended storage device 213, and the operation proceeds to step S510. In step S510, the boot control system 311 determines whether the extended storage device 213 has been formatted successfully in step S509. If the formatting has been performed successfully (Yes in step S510), the operation proceeds to step S511. Otherwise (No in step S510), the operation proceeds to step S518. In step S511, the boot control system 311 stores the connection state of the extended storage device 213 in step RAM 202 as "preparing for encryption and decryption", and the operation proceeds to step S512. In step S512, the boot control system 311 sets the encryption key stored in the security chip 214 in the encryption and decryption control system 314 so as to enable the extended storage device 213 to perform encryption and decryption, and the operation proceeds to step S513. In step S513, the boot control system 311 determines whether the encryption and decryption preparation process has been performed successfully in step S512. If the preparation process has been performed successfully (Yes in step S513), the operation proceeds to step 514. Otherwise, (No in step S513), the operation proceeds to step S519. In step S514, the boot control system 311 stores the connection state of the extended storage device 213 in the RAM 202 as "mounting", and the operation proceeds to step S515. In step S515, the boot control system 311 performs a process for mounting the extended storage device 213 to the "/PRINT" folder, and the operation proceeds to step S516. When the mounting process is completed with no error, the "/PRINT" folder becomes the storage area of the extended storage device 213. As a result, the mounting of the internal storage device 204 to the "/PRINT" folder is canceled. When the "/PRINT" folder is referred to, the extended storage device 213, instead of the internal storage device 204, is accessed.

Thus, received print jobs and created bibliographic information will be stored in the extended storage device 213. In step S516, the boot control system 311 determines whether the mounting process in step S515 has been performed successfully. If the mounting process has been performed successfully (YES in step S516), the operation proceeds to step S517. Otherwise (NO in step S516), the operation proceeds to step S520. In step S517, the boot control system 311 stores the connection state of the extended storage device 213 in the RAM 202 as "mounting completed" and ends the sequence. In step S518, the boot control system 311 stores the connection state of the extended storage device 213 in the RAM 202 as "initialization failed" and ends the sequence. In step S519, the boot control system 311 stores the connection state of the extended storage device 213 in the RAM 202 as "encryption and decryption preparation failed" and ends the sequence. In step S520, the boot control system 311 stores the connection state of the extended storage device 213 in the RAM 202 as "mounting failed" and ends the sequence. By referring to the connection state of the extended storage device 213 stored in the RAM 202 through the above process, each application can check how far the connection process of the extended storage device 213 has proceeded.

Figure 6A:
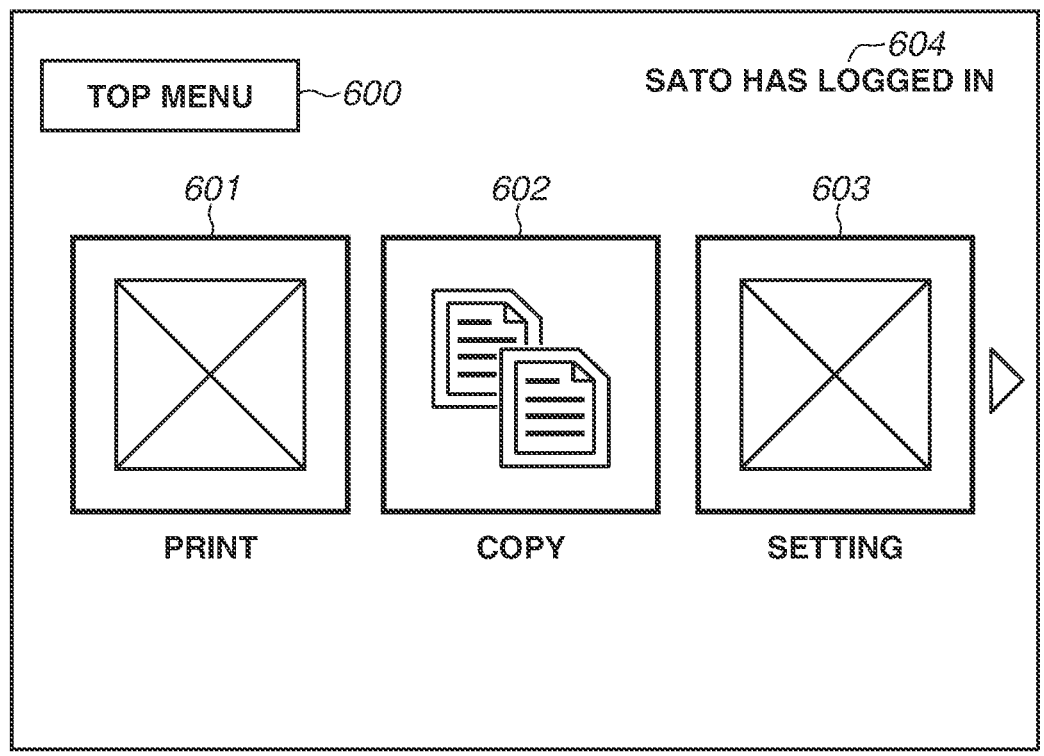
FIGS. 6A and 6B illustrate an example of a top menu screen and an example of a held job list screen, respectively, the screens being displayed on an operation unit of the image processing apparatus.

FIG. 6A illustrates an example of a top menu screen of the image processing apparatus 103 according to the present exemplary embodiment. This screen is displayed on the operation unit 206 of the image processing apparatus 103.

When a user has logged in to the image processing apparatus 103 by using an IC card or the like, a top menu 600 is displayed so that the user can select an application that the user wishes to use with the image processing apparatus 103 from the top menu 600. Since the user has logged in to the image processing apparatus 103, a login user name 604 is displayed on the screen. FIG. 6A illustrates a screen example displayed when the user having a user name "Sato" has logged in.

Icons of the applications 350 installed in the image processing apparatus 103 are displayed on the top menu 600. A print icon 601 corresponds to the print application 354, and when the print icon 601 is pressed, the print application 354 is started.

A copy icon 602 corresponds to the copy application 352, and when the copy icon 602 is pressed, the copy application 352 is started.

A setting icon 603 corresponds to one of the applications 350, and this application performs settings relating to the image processing apparatus 103.

Figure 6B:
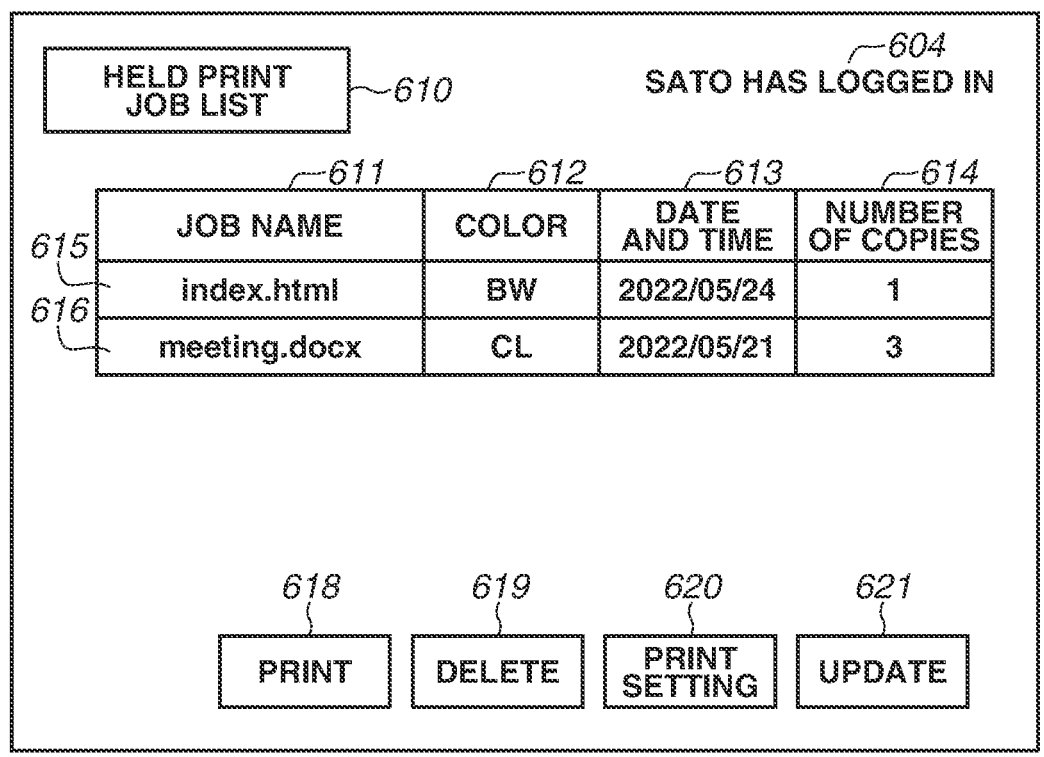

FIG. 6B illustrates an example of a held print job list screen of the image processing apparatus 103, which is an output apparatus according to the present exemplary embodiment. This screen is displayed on the operation unit 206 by the print application 354 executed by the CPU 201 of the image processing apparatus 103. A list of print jobs possessed by authenticated users is displayed on the held print job list screen. FIG. 6B illustrates a held print job list screen 610 of the print application 354, which is displayed when the print icon 601 is pressed. FIG. 6B illustrates a screen example displayed when the user having the user name "Sato" has logged in. On this screen example, a job name 611, a color and monochrome setting 612, an input date and time 613, and the number of copies 614 are displayed per print job. There are two print jobs (615 and 616) that can be operated on this screen. The print application 354 acquires bibliographic information about the login user "Sato" from the "/PRINT" folder and displays the acquired bibliographic information on the held print job list screen 610. A print button 618, a delete button 619, and a print setting button 620 are provided for these print jobs, and the user selects a desired print job from the displayed print jobs and presses a desired one of these buttons so that the corresponding operation is performed on the target print job. An update button 621 is further provided, and when the update button 621 is pressed, the print application 354 of the image processing apparatus 103 acquires the bibliographic information about the login user "Sato" again from the "/PRINT" folder and updates the display of the print job list based on the acquired bibliographic information.

FIG. 7 is a flowchart illustrating a process for determining choices of the print job storage period based on information indicating whether the image processing apparatus 103 is compatible with the extended storage device 213. This process is performed before a setting screen for the print job storage period is displayed. The job storage period setting screen will be described with reference to FIGS. 8A and 8B. In step S701, the print application 354 acquires choices of the storage period stored in advance in the internal storage device 204 and stores the acquired choices in the RAM 202, and the operation proceeds to step S702. In step S702, the print application 354 acquires the information indicating whether the image processing apparatus 103 is compatible with the extended storage device 213. This information is stored in advance in the internal storage device 204. Next, the operation proceeds to step S703. The information indicating whether the image processing apparatus 103 is compatible with the extended storage device 213 is different from the connection state of the extended storage device 213. For example, the information holds one of the following two values, such as "TRUE" indicating that the image processing apparatus 103 is compatible with the extended storage device 213 and "FALSE" indicating that the image processing apparatus 103 is not compatible with the extended storage device 213. In step S703, if the print application 354 has acquired information indicating that the image processing apparatus 103 is compatible with the extended storage device 213 (Yes in step S703), the operation proceeds to step S704. Otherwise (No in step S703), the print application 354 ends the present process. In step S704, the print application 354 adds choices of the job storage period of 30 days and 365 days, which are stored in advance in the internal storage device 204, to the choices of the storage period acquired in step S701 and stores the obtained result in the RAM 202. Next, the print application 354 ends the present process. Alternatively, the connection state of the extended storage device 213 described in FIG. 5 may be acquired as the value acquired in step S702, and whether the connection state of the extended storage device 213 is "mounting completed" may be determined in step S703. Still alternatively, whether the extended storage device 213 is connected may be checked in step S702 as in step S502, and whether the extended storage device 213 is connected may be determined in step S703. Still alternatively, whether the extended storage device 213 is usable may be checked in step S702 as in step S502, and whether the extended storage device 213 is usable may be determined in step S703.

Figure 8A:
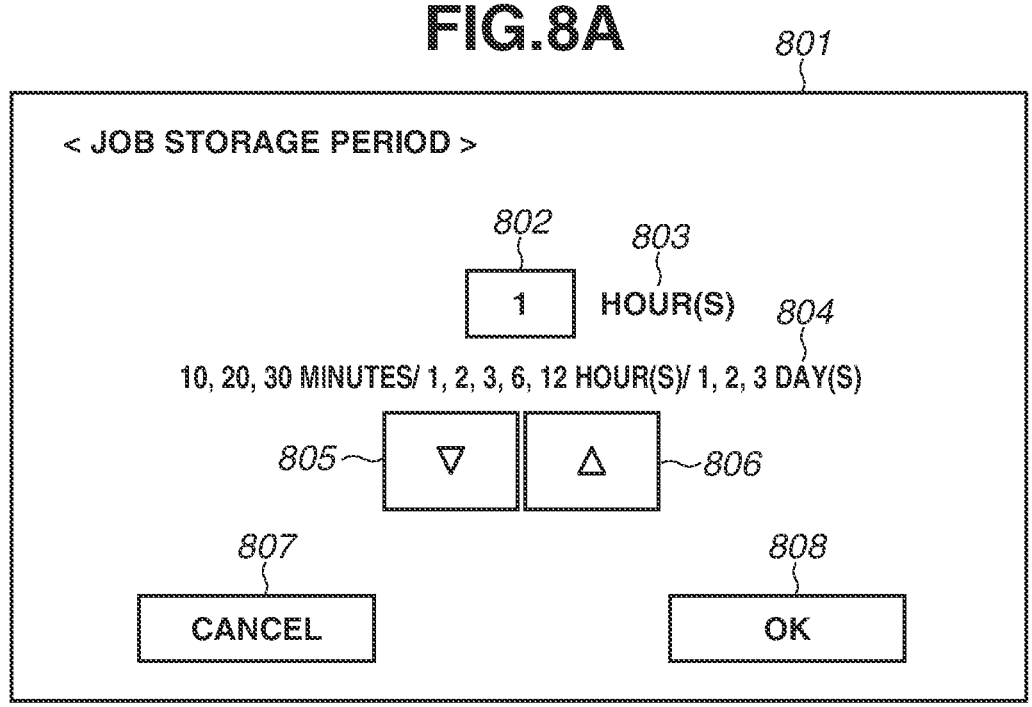
FIGS. 8A and 8B illustrate examples of a print job storage period setting screen of the image processing apparatus.
Figure 8B:
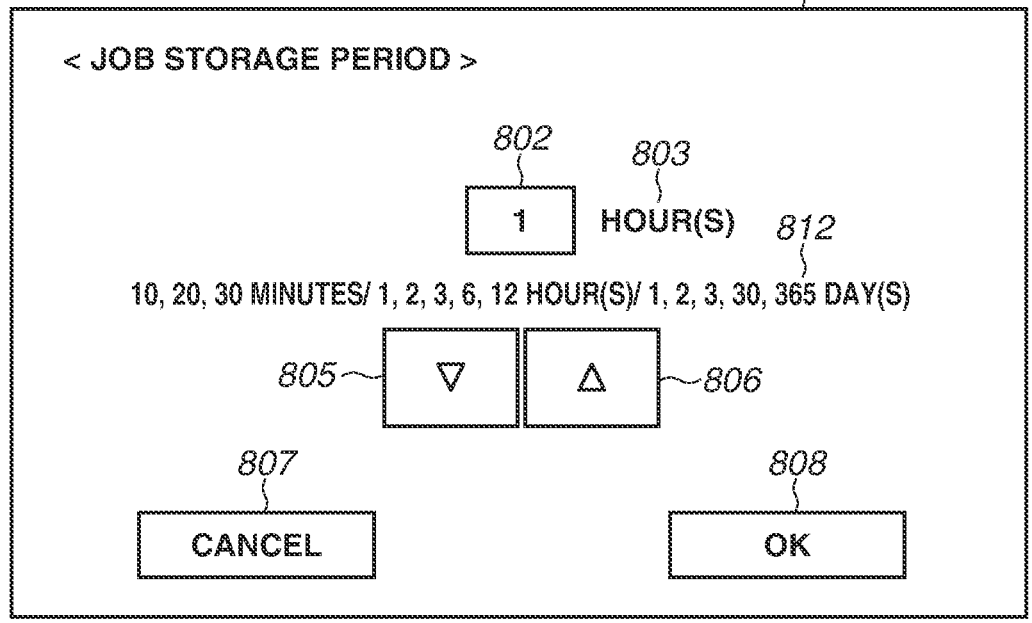

FIGS. 8A and 8B illustrate examples of the job storage period setting screen described with reference to FIG. 7. These screens are displayed on the operation unit 206 by the print application 354 executed by the CPU 201 of the image processing apparatus 103. In the process in FIG. 7, when the choices of the job storage period stored in the RAM 202 include 30 and 365 days, the print application 354 displays a job storage period screen 811 illustrated in FIG. 8B. When the choices stored in the RAM 202 do not include and 365 days, the print application 354 displays a job storage period screen 801 illustrated in FIG. 8A. An item 802 denotes a selected value, and an item 803 denotes a unit corresponding to the selected value. When a down button 805 is pressed, the print application 354 sets a storage period shorter than the currently selected value as a newly selected value. When the down button 805 is pressed while "1" is displayed in the item 802 and "hour(s)" is displayed in the item 803, "30" is displayed in the item 802 and "minute(s)" is displayed in the item 803. That is, 30 minutes is selected. When an up button 806 is pressed, the print application 354 sets a storage period longer than the currently selected value as a newly selected value. When the up button 806 is pressed while "12" is displayed in the item 802 and "hour(s)" is displayed in the item 803, "1" is displayed in the item 802 and "day(s)" is displayed in the item 803. That is, 1 day is selected. On the job storage period screen 811, when the up button 806 is pressed while "365" is displayed in the item 802 and "day(s)" is displayed in the item 803, the up button 806 is grayed out, that is, the up button 806 cannot be pressed (not illustrated). When a cancel button 807 is pressed, the print application 354 closes the screen 801 or 811 without changing the storage period. When an OK button 808 is pressed, the print application 354 stores the currently selected value in the internal storage device 204 as the print job storage period.

FIG. 9 is a flowchart illustrating a process in which the image processing apparatus 103 determines whether to hold a print job sent from the information processing apparatus 102. When hold printing is needed, the image processing apparatus 103 holds a print job and the bibliographic information about the print job. In step S901, the print application 354 executed by the CPU 201 of the image processing apparatus 103 receives a print job, and the operation proceeds to step S902. In step S902, the print application 354 acquires a processing mode stored in the internal storage device 204, and the operation proceeds to step S903. In step S903, if the processing mode acquired by the print application 354 in step S902 is "hold printing" (YES in step S903), the operation proceeds to step S904. Otherwise (NO in step S903), the operation proceeds to step S907. In step S904, the print application 354 creates bibliographic information from the print job received in step S901, and the operation proceeds to step S905. In step S905, the print application 354 stores the print job received in step S901 in the storage area of the "/PRINT" folder, and the operation proceeds to step S906. In step S906, the print application 354 stores the bibliographic information created in step S904 in the storage area of the "/PRINT" folder", and ends the present process. The print job held in this process is displayed in the print job list illustrated in FIG. 6B. In step S907, the print application 354 accesses the job and device control system 313 via the application platform 330, outputs the print job received in step S901, and ends the present process.

FIG. 10 is a flowchart illustrating a process in which the print application 354 determines whether time corresponding to the storage period for a held print job has elapsed. If the time has elapsed, the print application 354 deletes the print job and the bibliographic information about the print job. The process in this flowchart is performed at regular intervals while the print application 354 is running. In step S1001, the print application 354 acquires all the bibliographic information stored in the storage area of the "/PRINT" and stores the acquired bibliographic information in the RAM 202, and the operation proceeds to step S1002. In step S1002, the print application 354 determines whether step S1003 and subsequent steps have been performed on all the bibliographic information stored in the RAM 202. If all the bibliographic information has been processed (Yes in step S1002), the print application 354 ends the present process. Otherwise (NO in step S1002), the operation proceeds to step S1003. In step S1003, the print application 354 acquires the bibliographic information that has not been processed yet among all the bibliographic information acquired in step S1001, and the operation proceeds to step S1004. In step S1004, the print application 354 acquires the input date and time from the bibliographic information acquired in step S1003, and the operation proceeds to step S1005. In step S1005, the print application 354 acquires the current date and time from the timer 215, and the operation proceeds to step S1006. In step S1006, the print application 354 acquires the job storage period set on the job storage period setting screen in FIG. 8A or 8B, and the operation proceeds to step S1007. In step S1007, the print application 354 compares a date and time obtained by adding the input date and time and the job storage period with the current date and time to determine whether the time corresponding to the job storage period has elapsed from the input date and time. If the time corresponding to the job storage period has elapsed (YES in step S1007), the operation proceeds to step S1008. Otherwise (NO in step S1007), the operation proceeds to step S1002. In step S1008, the print application 354 deletes the print job corresponding to the bibliographic information from the storage area, and the operation proceeds to step S1009. In step S1009, the print application 354 deletes the bibliographic information acquired in step S1003 from the storage area, and the operation proceeds to step S1002. In the flowchart of the deletion process in FIG. 10, the input date and time is used for the determination process in step S1007. However, another date and time associated with a print job, other than the input date and time, may alternatively be used. For example, a print time at which a print job has been printed once may be stored in the storage area of the "/PRINT" folder, and whether the time corresponding to the job storage period has elapsed from the print time may be determined.

In the present exemplary embodiment, as indicated in FIGS. 7, 8A, and 8B, the choices of the job storage period are narrowed down in advance to several choices such as one hour and one day. However, only a lower limit and an upper limit may be set, and the job storage period may be set within the range therebetween.

In some embodiments, when the extended storage device 213 whose print job storage area has a capacity larger than that of the internal storage device 204 is connected, the user can set a longer job storage period for a print job, compared with a case where the print job is stored in the internal storage device 204.

In some embodiments, the choices of 30 days and 365 days stored in advance in the internal storage device 204 are added to the choices of the job storage period so that the print job can be stored for a longer period in a case where the extended storage device 213 is connected than in a case where the extended storage device 213 is not connected. However, when the upper limit is set to 365 days, problems might occur depending on the capacity of the storage area of the extended storage device 213. That is, although the capacity of the storage area becomes full, print jobs might not be deleted automatically or the capacity of the storage area might not be used sufficiently. Thus, a process for determining the upper limit value of the job storage period based on the capacity of the storage area of the extended storage device 213 will be described.

Figure 11:
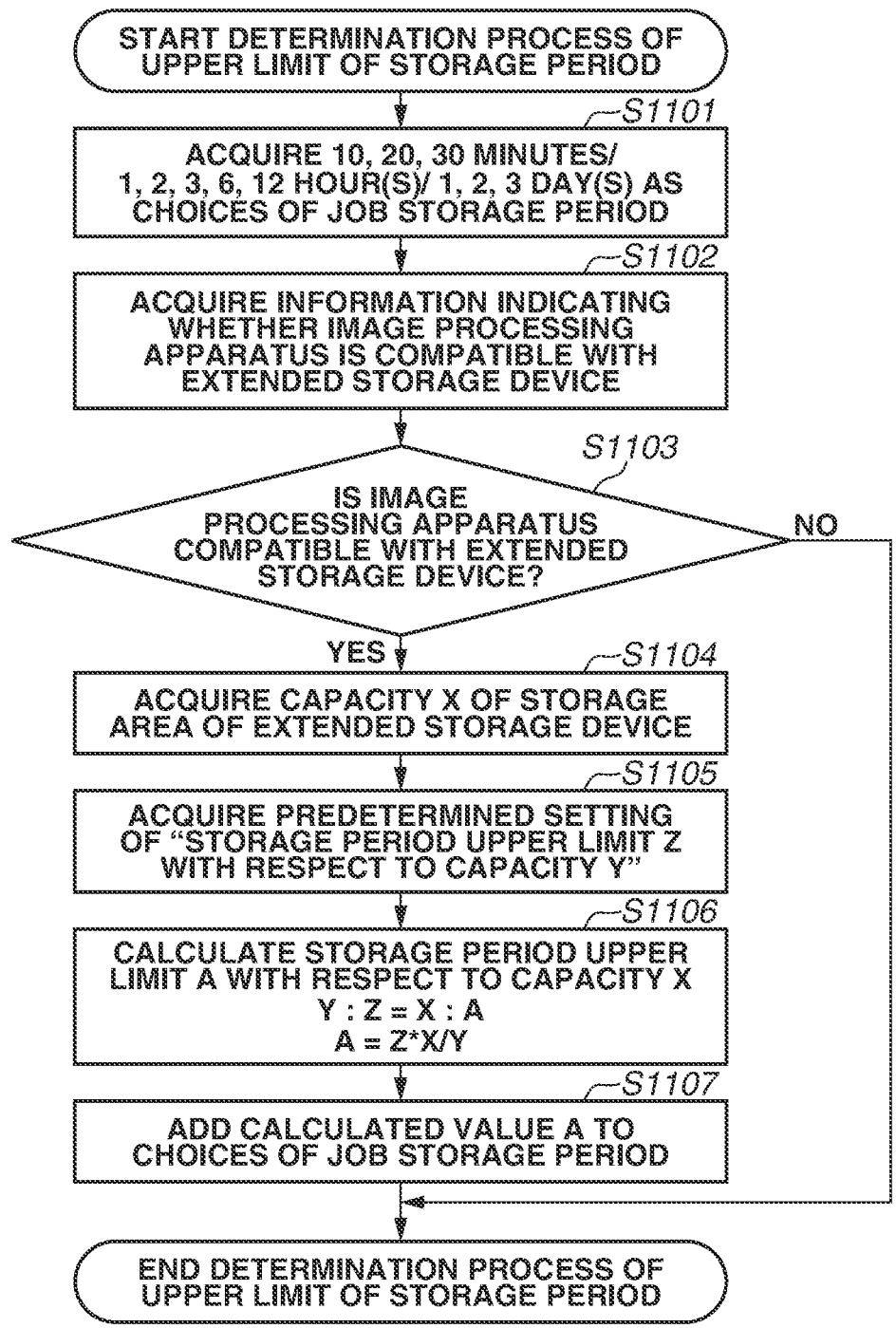
FIG. 11 is a flowchart illustrating an example of a process for determining the storage period upper limit of a print job of the image processing apparatus.

FIG. 11 is a flowchart illustrating a process for calculating the upper limit value of the job storage period based on the capacity of a storage area for print jobs and bibliographic information in the extended storage device 213, the process including part of the process illustrated in FIG. 7. Steps S1101 to S1103 are the same as steps S701 to S703, and description thereof will be omitted. In step S1103, if the information acquired in step S1102 indicates that the image processing apparatus 103 is compatible with the extended storage device 213 (YES in step S1103), the operation proceeds to step S1104. Otherwise (NO in step S1103), the print application 354 ends the present process.

In step S1104, the print application 354 acquires a storage area capacity X of the extended storage device 213, and the operation proceeds to step S1105. In step S1105, the print application 354 acquires a predetermined storage period upper limit Z with respect to a capacity Y from the internal storage device 204, and the operation proceeds to step S1106. In step S1106, the print application 354 calculates a storage period upper limit A with respect to the acquired storage area capacity X of the extended storage device 213. This step will be described with specific numerical values. When the value of the storage area capacity X is 100 GB, the value of the capacity Y is 1 GB, and the value of the storage period upper limit Z with respect to the capacity Y is 1 day, the value of the storage period upper limit A with respect to the storage area capacity X is 100 days, which is 100 times the storage period upper limit Z. Next, in step S1107, the print application 354 adds the value A calculated in step S1106 to the choices of the job storage period, and ends the present process.

Figure 12:
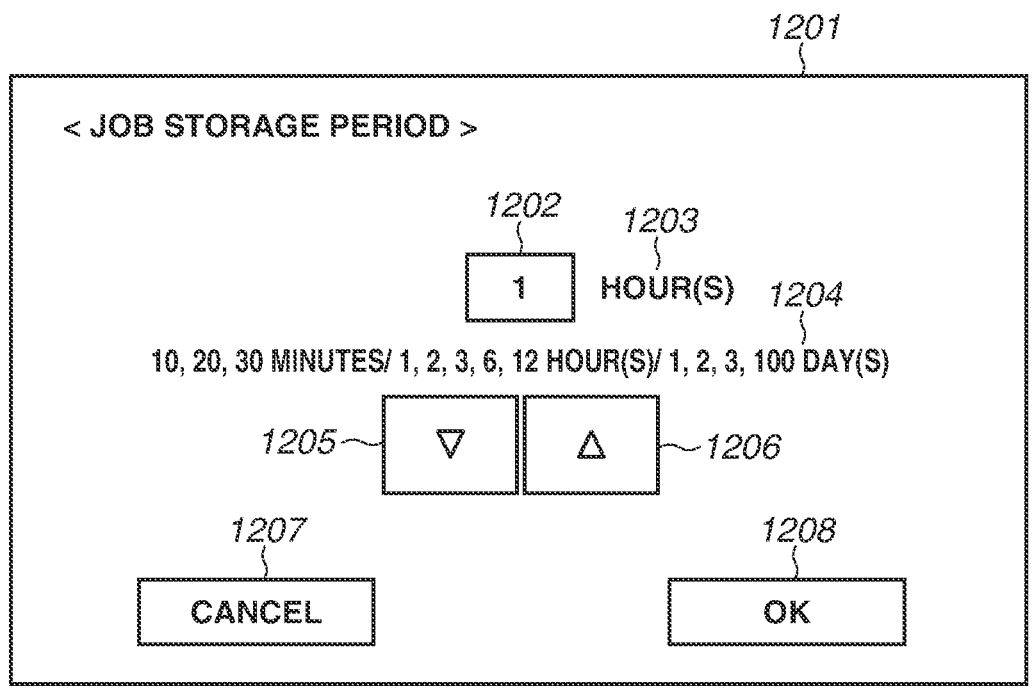
FIG. 12 illustrates an example of a print job storage period setting screen of the image processing apparatus.

FIG. 12 illustrates an example in which the upper limit value of the job storage period calculated in FIG. 11 is displayed as the upper limit value on the job storage period setting screen in FIG. 8A. This screen is displayed on the operation unit 206 by the print application 354 executed by the CPU 201 of the image processing apparatus 103. Because items 1202, 1203, and 1205 to 1208 are the same as the items 802, 803, and 805 to 808 in FIGS. 8A and 8B, description thereof will be omitted. An item 1204 indicates 100 days, which is obtained as the upper limit value A by performing the calculation with the above specific numerical values. This is only an example, and therefore, different values are displayed depending on the values of X, Y, and Z in FIG. 11.

In the present exemplary embodiment, as indicated in FIGS. 11 and 12, the choices of the job storage period are narrowed down in advance to several choices such as one hour and one day. However, a lower limit and an upper limit may be set in advance, and the job storage period may be set within the range therebetween.

As described above, according to some embodiments, when the extended storage device 213 whose print job storage area has a capacity larger than that of the internal storage device 204 is connected, the upper limit of the job storage period is calculated based on the capacity of the storage area for the print jobs and bibliographic information in the extended storage device 213. The user can set a job storage period based on the capacity of the extended storage device 213 and can sufficiently use the capacity of the extended storage device 213.

Other Exemplary Embodiments

Embodiments of the present disclosure also include an apparatus, a system, and a method thereof that are configured by appropriately combining the above embodiments.

Embodiments of the present disclosure provide an apparatus or a system serving as a main element that executes at least one software (program) for realizing the function of any one of the above-described exemplary embodiments. In addition, a method for realizing any one of the above-described exemplary embodiments executed by the apparatus or the system is also an exemplary embodiment of the present disclosure. In addition, the at least one software program is supplied to the system or the apparatus via a network or any one of various storage media, and the program is read and executed by at least one computer (a CPU, an MPU, or the like) of the system or the apparatus. That is, as an exemplary embodiment of the present disclosure, the program itself or any one of various computer-readable storage media that stores the program is also included. Any one of the above-described embodiments of the present disclosure can also be realized by a circuit (for example, an application specific integrated circuit (ASIC)) that realizes the function of this exemplary embodiment.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-098622, filed Jun. 20, 2022, which is hereby incorporated by reference herein in its entirety.

What is claimed is:

1. An image processing apparatus, comprising:
one or more processors; and
at least one memory coupled to the one or more processors and having stored thereon instructions, which when executed by the one or more processors, cause the image processing apparatus to:
receive a print job from an external apparatus;
store the received print job in a first storage device; and
provide a user with candidates for storage periods during which the print job is to be stored in the first storage device as first candidates, and set one period selected by the user from among the provided first candidates as the storage period for the print job,
wherein, in a case where a second storage device having a storage capacity larger than a storage capacity of the first storage device is connected, the image processing apparatus stores the received print job in the second storage device, and
wherein, in a case where the second storage device is connected, the image processing apparatus provides the user with candidates for storage periods that are longer than the storage periods included in the first candidates as second candidates, and sets one period selected by the user from among the first candidates and the second candidates as the storage period for the print job.

2. The image processing apparatus according to claim 1, wherein the first storage device is an internal storage device included in the image processing apparatus.

3. The image processing apparatus according to claim 1, wherein the second storage device is an extended storage device mounted on the image processing apparatus.

4. The image processing apparatus according to claim 1, wherein, in a case where the second storage device is not connected, the image processing apparatus stores the received print job in the first storage device, and wherein, in a case where the second storage device is not connected, the image processing apparatus sets the one period selected from among the first candidates.

5. The image processing apparatus according to claim 1, wherein the instructions, when executed by the one or more processors, further cause the image processing apparatus to provide, in a case where the second storage device is not connected, a first setting screen for setting the one period selected from among the first candidates, and to provide, in a case where the second storage device is connected, a second setting screen for setting the one period selected from among the first candidates and the second candidates,
wherein the second candidates are not settable on the first setting screen, and
wherein the second candidates are settable on the second setting screen.

6. The image processing apparatus according to claim 1, wherein the instructions, when executed by the one or more processors, further cause the image processing apparatus to calculate, in a case where the second storage device is connected, the one period selected from among the first candidates and the second candidates based on the storage capacity of the second storage device,
wherein the image processing apparatus sets the calculated one period selected from among the first candidates and the second candidates as the storage period for the print job stored in the second storage device.

7. The image processing apparatus according to claim 1, wherein the instructions, when executed by the one or more processors, further cause the image processing apparatus to delete, in a case where a print job stored in the second storage device reaches the set one period selected from among the first candidates and the second candidates, the print job.

8. A control method of an image processing apparatus, the control method comprising:
receiving a print job from an external apparatus;
storing the received print job in a first storage device; and
providing a user with candidates for storage periods during which the print job is to be stored in the first storage device as first candidates, and setting one period selected by the user from among the provided first candidates as the storage period for the print job,
wherein, in a case where a second storage device having a storage capacity larger than a storage capacity of the first storage device is connected, the received print job is stored in the second storage device in the storing, and
wherein, in a case where the second storage device is connected, the user is provided with candidates for storage periods that are longer than the storage periods included in the first candidates as second candidates in the providing, and one period selected by the user from among the first candidates and the second candidates is set as the storage period for the print job in the setting.

9. The control method according to claim 8, wherein the first storage device is an internal storage device included in the image processing apparatus.

10. The control method according to claim 8, wherein the second storage device is an extended storage device mounted on the image processing apparatus.

11. A non-transitory computer-readable storage medium storing one or more programs including instructions, which when executed by one or more processors of an image processing apparatus, cause the image processing apparatus to perform a control method including:
receiving a print job from an external apparatus;
storing the received print job in a first storage device; and providing a user with candidates for storage periods during which the print job is to be stored in the first storage device as first candidates, and setting one period selected by the user from among the provided first candidates as the storage period for the print job, wherein, in a case where a second storage device having a storage capacity larger than a storage capacity of the first storage device is connected, the received print job is stored in the second storage device in the storing, and wherein, in a case where the second storage device is connected, the user is provided with candidates for storage periods that are longer than the storage periods included in the first candidates as second candidates in the providing, and one period selected by the user from among the first candidates and the second candidates is set as the storage period for the print job in the setting.

\* \* \* \* \*